(12) United States Patent
Michelstein et al.

(10) Patent No.: US 8,990,140 B2
(45) Date of Patent: Mar. 24, 2015

(54) TRANSFORMING DATA INTO CONSUMABLE CONTENT

(75) Inventors: Jennifer Michelstein, Kirkland, WA (US); David Benjamin Lee, Sammamish, WA (US); Nathaniel George Freier, Seattle, WA (US); Katrika Morris, Issaquah, WA (US); Christopher Hugh Pratley, Seattle, WA (US); Brett David Brewer, Sammamish, WA (US); Sarah Faulkner, Seattle, WA (US); Steven Richard Hollasch, Redmond, WA (US); Ilya Tumanov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 318 days.

(21) Appl. No.: 13/491,612

(22) Filed: Jun. 8, 2012

(65) Prior Publication Data

US 2013/0332475 A1   Dec. 12, 2013

(51) Int. Cl.
| | |
|---|---|
| *G06N 5/02* | (2006.01) |
| *G06Q 10/00* | (2012.01) |
| *G06F 3/00* | (2006.01) |
| *G06F 17/21* | (2006.01) |

(Continued)

(52) U.S. Cl.
CPC .......... *G06F 17/211* (2013.01); *G06F 17/2229* (2013.01); *G06F 17/2264* (2013.01); *G06F 17/30867* (2013.01)
USPC ............................... 706/47; 715/700; 705/1.1

(58) Field of Classification Search
CPC .................... G06F 17/30716; G06F 17/30991; G06F 17/30572
See application file for complete search history.

(56) References Cited

U.S. PATENT DOCUMENTS

| 6,775,675 B1 | 8/2004 | Nwabueze et al. |
| 7,274,832 B2 | 9/2007 | Nicponski |

(Continued)

FOREIGN PATENT DOCUMENTS

| EP | 1 220 531 | 7/2002 |
| WO | WO 2007/021556 | 2/2007 |

OTHER PUBLICATIONS

Abidi, "Intelligent Information Personalization: from issue to strategies," Published Sep. 30, 2008, In Panagiotis Germanakos (Eds) Intelligent User Interfaces: Adaptation and Personalization Systems and Technologies, 21 Pages.

(Continued)

*Primary Examiner* — Alan Chen
(74) *Attorney, Agent, or Firm* — Jessica Meyers; Jim Ross; Micky Minhas

(57) ABSTRACT

Concepts and technologies are described herein for transforming data into consumable content. In accordance with the concepts and technologies disclosed herein, a computing device can execute a transformation engine for transforming data into the consumable content. The computing device can be configured to analyze the data to identify relationships within data elements or other portions of the data. The computing device also can determine a visualization model to apply to the data and to choose a world based upon the determined visualization model. The computing device can obtain rules associated with the selected or chosen world, and can apply the rules to the data to generate the output. In some embodiments, the computing device can be configured to obtain and apply feedback to the output.

20 Claims, 6 Drawing Sheets

(51) Int. Cl.
*G06F 17/22* (2006.01)
*G06F 17/30* (2006.01)

(56) References Cited

U.S. PATENT DOCUMENTS

| | | | |
|---|---|---|---|
| 7,912,246 | B1 | 3/2011 | Moon et al. |
| 2004/0130566 | A1 | 7/2004 | Banerjee et al. |
| 2005/0097463 | A1 | 5/2005 | Yu |
| 2006/0048042 | A1 | 3/2006 | Sembower et al. |
| 2006/0150088 | A1 | 7/2006 | Kraft et al. |
| 2007/0064278 | A1 | 3/2007 | Sugimoto |
| 2007/0070408 | A1 | 3/2007 | Ono et al. |
| 2007/0101251 | A1 | 5/2007 | Lee et al. |
| 2008/0205712 | A1 | 8/2008 | Ionita et al. |
| 2008/0245211 | A1 | 10/2008 | Lemons |
| 2009/0278937 | A1 | 11/2009 | Botchen et al. |
| 2010/0037273 | A1 | 2/2010 | Dressel et al. |
| 2011/0055722 | A1 | 3/2011 | Ludwig et al. |
| 2011/0158510 | A1 | 6/2011 | Aguilar et al. |
| 2011/0169835 | A1 | 7/2011 | Cardno et al. |
| 2012/0053986 | A1* | 3/2012 | Cardno et al. ............... 705/7.29 |
| 2012/0095863 | A1 | 4/2012 | Schiff |
| 2012/0278704 | A1 | 11/2012 | Ying et al. |
| 2014/0025619 | A1 | 1/2014 | Michelstein et al. |
| 2014/0025650 | A1 | 1/2014 | Lee et al. |
| 2014/0026038 | A1 | 1/2014 | Lee et al. |

OTHER PUBLICATIONS

Beale, "Supporting Serendipity: Using Ambient Intelligence to Augment User Exploration for Data Mining and Web Browsing", May 2007, Proceedings: International Journal of Human-Computer Studies, vol. 65(5): 421-433.

Bucaro, "Configure Folder Options," Published on: Sep. 26, 2013, Bucaro TecHelp, Available at: http://bucarotechelp.com/computers/wintips/94052503.asp, 6 pp.

Choi et al., "Exploring Factors of Media Characteristic Influencing Flow in Learning through Virtual Worlds", Jan. 12, 2011, *Computers & Education*, pp. 2382-2394.

El-Bakry et al., "Face Detection Using Neural Networks and Image Decomposition", May 12, 2002, in *Proceedings of the 2002 International Joint Conference: Neural Networks*, 2002, pp. 1045-1050.

Esposito, "More Windows 2000 UI Goodies: Extending Explorer Views by Customizing Hypertext Template Files," Published on: Jun. 2000, Microsoft, Available at: http://msdn.microsoft.com/en-us/magazine/cc302292.aspx, 12pp.

Feng, et al., "Salient object detection by composition" 2011, In IEEE International Conference on Computer Vision (ICCV), 8 pgs.

Griebel "Repository Support for Visualization in Relational Databases," Sep. 1996, Available at:http://citeseerx.ist.psu.edu/viewdoc/download?doi=10.1.1.12.2225&rep=rep1&type=pdf, pp. 121.

Hinz et al., "Personalization-based optimization of web interfaces for mobile devices," 2004, *Field Programmable Logic and Applications*, vol. 3160, pp. 204-215.

Jackson, "Windows 2000 Root Kit Analysis: Attack of Nov. 1, 2003," Published on Sep. 26, 2013, gatech.edu, Available at: http://users.ece.gatech.edu/owen/Research/HoneyNetlQuarterly/Analysis_oCWindows_2000_root-kit.htm, 4 pp.

Kamba et al., "The Krakatoa chronicle an interactive, personalized, newspaper on the web," Dec. 1995, In Proceedings of the Fourth International World Wide Web Conference, 15 Pages.

Karlkapp, "Virtual Worlds and Compliance", Published on: Feb. 15, 2011, Available at: http://www.kaplaneduneering.com/kappnotes/index.php/2011/02/virtual-worlds-and-compliance/, 5 pp.

Kuan et al., "Color-Based Image Salient Region Segmentation Using Novel Region Merging Strategy", Aug. 2008, In IEEE Transactions on Multimedia, 10.5: 832-845.

Linden, "This Project Viewer Lets Landowners Control Environment Settings", Published on: Jun. 13, 2011, Available at: http://community.secondlife.com/t5/Land/bg-p/landandbusiness, 3pp.

Mansmann, et al., "Exploring OLAP Aggregates with Hierarchical Visualization Techniques", Mar. 11-15, 2007, *Proceedings: SAC '07, Proceedings of the 2007 ACM symposium on applied computing*, pp. 1067-1073.

Mikolajczyk, et al., "A Performance Evaluation of Local Descriptors," Oct. 2005, *IEEE Transactions on Pattern Analysis and Machine Intelligence*, pp. 1615-1630.

Rowe, et al., "Implementation and Evaluation of an Adaptive Multimedia Presentation System (AMPS) with Contextual Supplemental Support Media", Jun. 13-19, 2010, *Proceedings of MMEDIA '10, Proceedings of the 2010 Second International Conferences on Advances in Multimedia*, pp. 134-139.

Schrier et al., "Adaptive layout for dynamically aggregated documents," Jan. 13, 2008, *Proceedings of the 13the International Conference on Intelligent User Interfaces IUI '08*, Maspalomas, Spain, 10 pp.

Stewart, et al., "Software Environments for Scenario-based Learning", Published on: Aug. 20, 2009, Available at: http://akoaotearoa.ac.nz/download/ng/file/group-6/n3498-software-environments-for-scenario-based-learning-a-snapshot-comparison-of-some-available-tools.pdf, 24pp.

Stolte, et al., "Multiscale Visualization Using Data Cubes," Apr. 2003, In *Proceedings: IEEE Transactions on Visualization and Computer Graphics*, 9(2):176-187.

Shultz, "Associating File types with Multiple Applications," Published on: Apr. 2001, Available at: msdn.microsoft.com/enus/library/ms977165.aspx, 5 pp.

Wichary, Mouse 2006 [Captured on Sep. 26, 2013], Guidebook Gallery, Available at: http://www.guidebookgallery.org/screenshots/mouse, 26 pp.

Wunsche, "A Survey, Classification and Analysis of Perceptual Concepts and their Application for the Effective Visualisation of Complex Information", Feb. 1, 2004, In *Proceedings: APVis '04 Proceedings of the 2004 Australasian symposium on Information Visualisation*, vol. 35, pp. 17-24.

International Search Report dated Nov. 12, 2013 in Application No. PCT/US13/050964.

International Search Report dated Oct. 4, 2013 in Application No. PCT/US13/042954.

U.S. Official Action dated Oct. 28, 2013 in U.S. Appl. No. 13/551,638.

"Flexible Authoring Solutions for Learning Professionals", Retrieved at <<http://www.adobe.com/resources/elearning/pdfs/flexible_authoring_solutions_wp.pdf>> Nov. 2007, pp. 4.

"Cognitive Informatics", Retrieved at <<http://www.pnl.gov/coginformatics/elearning_approach.stm>> Retrieved Date: Dec. 27, 2011, pp. 2.

Blokzijl, et al., "The Effect of Text Slides Compared to Visualizations on Learning and Appreciation in Lectures", Retrieved at <<http://ieeexplore.ieee.org/xpl/freeabs_all.jsp?arnumber=4464074>> IEEE International Professional Communication Conference, 2007, IPCC2007. Oct. 1-3, 2007, pp. 9.

"Captivate 4: Produce Interactive Simulations and Demonstrations", Retrieved at <<http://cit.jmu.edu/useruploads/files/captivate4tutorial.pdf>> Retrieved Date: Dec. 27, 2011, pp. 1-11.

U.S. Official Action dated Feb. 10, 2014 in U.S. Appl. No. 13/551,638.

International Search Report dated Jan. 29, 2104 in International Application No. PCT/US13/050961.

International Search Report dated Jan. 27, 2104 in International Application No. PCT/US13/050968.

Dobrikov et al., "The Architecture of a Corporate Information and News Engine," Jun. 19, 2013, *Proceedings of the 4th International Conference on Computer Systems and Technologies e-Learning*, 6 pp.

Huang et al., "Header Metadata Extraction from Semi-structured Documents Using Template Matching," 2006, *Lecture Notes in Science: On the Move to Meaningful Internet Systems*, vol. 4278, pp. 1776-1785.

Jovanovic et al., "Automating Semantic Annotation to Enable Learning Content Adaptation," 2006, *Adaptive Hypermedia and Adaptive Web-Based Systems Lecture Notes in Computer Science*, Springer, Berlin, Germany, pp. 151-160.

(56) References Cited

OTHER PUBLICATIONS

Jovanovic et al., "Ontology-based Automatic Annotation of Learning Content," Apr.-Jun. 2006, *International Journal on Semantic Web & Information Systems*, 2(2): 91-119.

Kaiser et al., "Information Extraction: A Survey," May 2005, Technical Report, Vienna University of Technology, 32 pp.

Witten et al., "Importing Documents and Metadata into Digital Libraries: Requirements Analysis and an Extensible Architecture," 2002, In *Research and Advanced Technology for Digital Libraries*, Springer, Berlin, vol. 2458, pp. 390-405.

"Feedback", dictionary.com, Captured Feb. 5, 2014, Available at: Http://dictionary.reference.com/browse/feedback, 3pp.

U.S. Official Action dated Jul. 16, 2014 in U.S. Appl. No. 13/552,662.

U.S. Official Action dated Jun. 26, 2014 in U.S. Appl. No. 13/551,638.

U.S. Notice of Allowance dated Nov. 6, 2014 in U.S. Appl. No. 13/552,662.

U.S. Official Action dated Nov. 6, 2014 in U.S. Appl. No. 13/551,638.

U.S. Official Action dated Jan. 14, 2015 in U.S. Appl. No. 13/552,416.

\* cited by examiner

TRANSFORMING DATA INTO CONSUMABLE CONTENT

BACKGROUND

The availability and diversity of software that can be used to create content has increased, as has the number of venues available for publishing content. Similarly, instant publication of information via various live messaging and/or social networking sites has revolutionized data sharing by greatly accelerating the speed and frequency with which data is published by users. Because of these and other changes in the various ways data is created, generated, shared, and/or published, the number and diversity of users creating, sharing, and/or publishing content has increased along with the size of audiences of these content creators, sharers, and/or publishers.

Because almost any technology user today creates, generates, shares, and/or publishes content, some users or other entities creating, generating, sharing, or publishing the content may not be trained in design principles. As a result, some of these entities may not be capable of producing visual content in a consumable, useful, or visually appealing format. Thus, the utility of some content created, generated, shared, or published by these or other entities may be enhanced by applying better designs.

Some publishers may choose to compile information into a document. Other publishers may load information into a presentation, video, or other output. These presentations or documents may include too much or too little information to be useful, or may lack a thoughtful and design-based format that allows viewers or consumers to easily access important information within the document or presentation. Because visual aspects of a particular presentation or document may distract consumers from the usefulness or importance of the underlying data or facts presented within the presentation or document, some content may not receive the attention deserved. Alternatively, some publishers may expend resources to create or commission others to create visually consumable content.

It is with respect to these and other considerations that the disclosure made herein is presented.

SUMMARY

Concepts and technologies are described herein for transforming data into consumable content. As used herein, the term "consumable" can be used to refer to content that can be readily viewed, interpreted, or accessed by a user, viewer, or other entity. In some instances, the content or portions thereof can be arranged in accordance with hierarchical or logical relationships and/or in accordance with applied design rules. In accordance with the concepts and technologies disclosed herein, data can be obtained by a computing device. In some instances, the data can include a text file, a web page, a document, a presentation file, a spreadsheet, a video, a photo or other image, or another type of data. The data can be obtained in various formats and can be analyzed to identify relationships between data elements and/or portions of the data. The relationships can be used to identify hierarchies, emphasis, clusters, and/or to otherwise obtain an understanding of the data.

The computing device can determine how to introduce differences or variations to the data. The variations can include differences in animations, effects, layouts, color schemes, or other design variations. The computing device also can select a world for presenting the data. As used herein, the term "world" can be used to refer to an approach, model, or theme for presenting data. The computing device can select a world for presentation of the data and can apply the world to the data using one or more sets of rules that define how data is translated into the world. In some embodiments, the rules can be tailored for each world and can define, for example, how data of a particular type is to be represented in the selected or chosen world.

Through application of the variations, visualization models, worlds, and/or rules, the computing device can generate output that includes the consumable content. The output can include a presentation, a document, a video, an interactive data output, or other data. In some embodiments, the computing device presents the output to a user or other entity and the user or other entity expresses preferences relating to various aspects of the output. Thus, for example, the user can express whether a particular aspect of the output is liked or disliked, and the computing device can be configured to apply the expressed likes or dislikes to the output. As such, the computing device can be configured to modify the output in accordance with user preferences. The computing device also can be configured to store the preferences for future use.

According to one aspect, a computing device obtains data. The data can be obtained from a local or remote storage device such as the Internet, a server, or the like. The computing device can be configured to execute a transformation engine for analyzing the data, identifying relationships within the data, determining a visualization model, choosing a world, applying rules such as design rules associated with the world to the data, and generating the output. In some embodiments, the transformation engine can include or can be substituted for by a number of modules. The modules can include a decomposition and understanding module, a variation module, and a world chooser module. The transformation engine also can include representations of the rules for translating the data based upon the chosen or selected world, and the transformation engine can be configured to apply the rules to the data to generate output.

According to another aspect, the transformation engine also can include an authoring module. The authoring module can be configured to obtain and apply user input or feedback with regard to the output. The feedback can be obtained directly from the user or other entity. The feedback can be obtained in response to one or more prompts that can be generated by the computing device. As such, the computing device can be configured to generate the output and to modify the output based upon user preferences. The computing device also can be configured to store the preferences for future use and/or application to other data.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
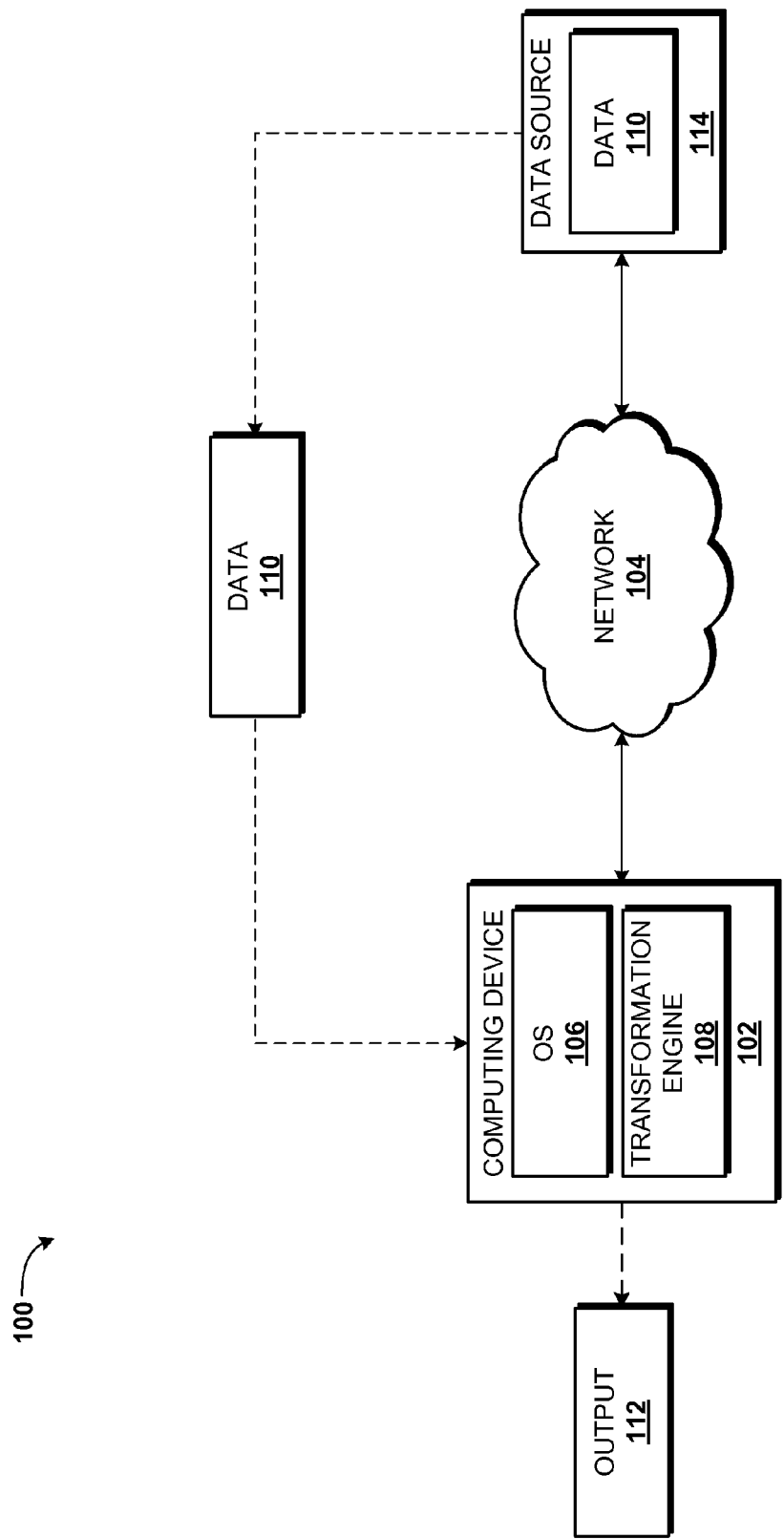
FIG. 1 is a system diagram illustrating an illustrative operating environment for the various embodiments disclosed herein.

The following detailed description is directed to concepts and technologies for transforming data into consumable content. According to the concepts and technologies described herein, a computing device can execute a transformation engine for transforming data into the consumable content. In some embodiments, the computing device obtains data from a local or remote storage device such as a memory or server, the Internet, or the like. In some other embodiments, the data is generated at the computing device using an application program executing at the computing device. The computing device can be configured to execute the transformation engine to analyze the data. Via analysis of the data, the computing device can identify relationships within data elements or other portions of the data. The computing device also can execute the transformation engine to determine variations to apply to the data and to select a visualization model and/or world to apply to the data. The computing device also can execute the transformation engine to obtain rules associated with the selected or chosen world and to apply the rules to the data to generate output.

The computing device also can be configured to obtain and apply input or feedback from a user or other entity. The feedback can be interpreted by the computing device to understand preferences of the user or other entity with regard to the output. The input or feedback can be obtained directly from the user or other entity and/or can be obtained in response to one or more prompts that can be generated by the computing device. Based upon the input or feedback, the computing device can be configured to modify the output or to determine that the output is not to be modified. The computing device also can be configured to store the preferences for future use and/or for application to other data. The preferences stored by the computing device can include preferences not only for a particular user, but additionally or alternatively for multiple or all users. Additionally, or alternatively, the preferences can relate to the specific content or output, as well as the user or users. Thus, the preferences also can indicate, for example, that a particular data element, cluster of data elements, presentation aspect, presentation or design scheme, rule, or the like, is more or less important than other data elements, clusters of data elements, presentation aspects, presentation or design schemes, rules, or the like.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for transforming data into consumable content will be presented.

Referring now to FIG. 1, aspects of one operating environment 100 for the various embodiments presented herein will be described. The operating environment 100 shown in FIG. 1 includes a computing device 102. According to various embodiments, the functionality of the computing device 102 can be provided by a personal computer ("PC") such as a desktop, tablet, or laptop computer system. The functionality of the computing device 102 also can be provided by other types of computing systems including, but not limited to, server computers, handheld computers, netbook computers, embedded computer systems, personal digital assistants, mobile telephones, smart phones, or other devices or systems capable of executing the various software elements described herein in detail. For purposes of describing the concepts and technologies disclosed herein, the computing device 102 is described herein as including a PC. It should be understood that this embodiment is illustrative, and should not be construed as being limiting in any way.

According to some embodiments, the computing device 102 is configured to operate in communication with, or as part of, a communications network ("network") 104. In some other embodiments, the computing device 102 does not operate in communication with the network 104. The computing device 102 can be configured to execute an operating system 106 and one or more application programs, modules, software elements, or other computer-executable or computer readable instructions such as, for example, a transformation engine 108.

The operating system 106 is a computer program for controlling the operation of the computing device 102. The transformation engine 108 can include an executable program configured to execute on top of the operating system 106 to provide the functionality described herein for transforming information into consumable content. Although the transformation engine 108 is illustrated as a component of the computing device 102, it should be understood that the transformation engine 108 may be embodied as or in a stand-alone device or components thereof operating as part of or in communication with the network 104 and/or the computing device 102. The transformation engine 108 also can be a virtualized service or technology layer that executes on the computing device 102 and/or on other real or virtual devices. Thus, the illustrated embodiment is illustrative, and should not be construed as being limiting in any way.

As will be explained in more detail below, particularly with reference to FIGS. 2-3, the transformation engine 108 can be configured to obtain data 110 and to transform the data 110 into consumable content that can include, or can be included within, output 112 generated by the computing device 102. As used herein, the term "consumable" can be used to refer to output such as the output 112 that can be readily or easily viewed, interpreted, or accessed by a user or viewer. More particularly, as explained in more detail below, the output 112 can include various data elements or portions of the data 110 that are arranged by the transformation engine 108 in accordance with the various concepts and technologies disclosed herein. As such, it can be appreciated that the data 110 can include a number of data elements or other portions of data.

In some embodiments, the transformation engine 108 is configured to translate or arrange the data 110 into a relationship-based design. This relationship-based design can be, but is not necessarily, arranged in a logical and/or hierarchical fashion and/or can be arranged in accordance with various designer-based presentation rules for arranging and/or laying out data. Thus, the phrase "consumable content" can, but does not necessarily, refer to visually appealing and/or logically arranged data. It should be understood, however, that the output 112 as described herein need not be visually appealing and/or that visual appeal can be subjective. As such, the output 112 can include various data elements or other portions of the data 110 translated into the output 112 as described herein.

According to various embodiments, the computing device 102 is configured to receive or store the data 110. For example, the data 110 can be stored at the computing device 102 in a memory, disk drive, or other data storage elements. In some other embodiments such as the embodiment illustrated in FIG. 1, the data 110 can be obtained from a data source 114 that can be configured to operate as part of or in communication with the network 104. The functionality of the data source 114 can be provided by a network drive, a server computer operating on or in communication with the network 104, a database or another real or virtual data storage element, and/or other data storage devices. It should be understood that these embodiments are illustrative, and should not be construed as being limiting in any way.

According to various aspects of the concepts and technologies disclosed herein, the transformation engine 108 can include one or more applications, programs, software, computer executable instructions, and/or other data. Some examples of data that can be included as part of the transformation engine 108 are illustrated and described in more detail below with reference to FIG. 2. Briefly, the computer-executable instructions can include instructions for decomposing and understanding content included with the data 110, instructions for generating and/or suggesting variations to be employed when presenting the data 110 as part of the output 112, instructions for choosing a theme, mood, color scheme, animations, layout, and/or other aspects ("world") to be employed in generating the output 112, rules for tailoring a selected or chosen world, and/or instructions for modifying output based upon input from users or other entities.

These and other aspects of the transformation engine 108 can be provided by a single or multiple applications or modules. Thus, the computing device 102 can, by execution of the transformation engine 108, receive the data 110, determine how the data 110 is to be presented, generate the output 112 for presenting the data in the determined formats, schemes, themes, or the like, and present the output 112. Before, during, or after presentation of the output 112, the computing device 102 also can be configured to obtain input or feedback ("feedback") regarding the output 112 from users or other entities. In some embodiments, the computing device 102 can be configured to prompt users for the feedback. In some other embodiments, the computing device 102 can be configured to receive the feedback from various users or other entities without prompting for the feedback.

Based upon the feedback received by the computing device 102, the output 112 associated with the computing device 102 can be tailored to reflect preferences, likes, dislikes, or the like associated with the user or other entity. As such, the computing device 102 can be configured not only to present the data 110 in a format that is determined by the computing device 102, but furthermore in a format that is tailored by and/or modified by the user or other entity via providing feedback. It should be understood that this embodiment is illustrative, and should not be construed as being limiting in any way.

In some embodiments, the computing device 102 retrieves, receives, or otherwise obtains the data 110. The data 110 can be obtained from a local data storage device or from a remote data storage device or entity such as the data source 114. The data 110 can include almost any type of information including, but not limited to, documents, text, images, presentations, spreadsheets, web pages, video, media, or other information. Because the data 110 can include other types of information or content, it should be understood that these embodiments are illustrative, and should not be construed as being limiting in any way.

The computing device 102 can be configured to analyze the data 110 to identify a hierarchy and/or relationships within the data 110. In particular, the computing device 102 can be configured to identify relationships between one or more data elements or portions of data that are included within the data 110. For example, if the data 110 includes a presentation document, the data elements can include slides of the presentation, objects within slides of the presentation, and/or other portions of data included in the presentation such as individual text characters, images, sentences, words, bullet lists, numbered lists, text blocks, backgrounds, title blocks, media objects, or the like. The computing device 102 can be configured to analyze the various elements or portions ("data elements") of the data 110 to identify relationships between the various data elements and/or to identify a hierarchy within the data 110. Similarly, the computing device 102 can be configured to recognize relationships between one or more instances of data 110. For example, images from a FLICKR or other photo album software can be associated with status updates or messages such as FACEBOOK or TWITTER updates and/or timestamp information to identify relationships between the images. Because other types of data and/or data sources can be used to identify relationships between elements of the data 110, these examples should be understood as being illustrative, and should not be construed as being limiting in any way.

The computing device 102 also can be configured to determine a visualization model to be used for generating the output 112. In particular, the computing device 102 can determine variations that can be included when generating the output 112 to provide differentiated output as the output 112. For example, the computing device 102 can apply variations in animations, image sizes, text effects, layouts, color schemes, themes, or other visualizations to the data included as the output 112 to provide highly differentiated output. Thus, a user of the computing device 102 can generate a unique product using the computing device 102 even if other users provide substantially similar or even identical input.

The computing device 102 also can be configured to choose a world that is to be used for generating the output 112.

The term "world" as used herein can be used to refer to a type or category of visualizations and/or themes that can be applied to the data 110 and used to generate the output 112. The worlds can include instructions for visualizing the data 110 in two-dimensional ("2D") or three-dimensional ("3D") visualizations; specifying fonts and font formats; images and image formats; animations; backgrounds; text block sizes and layouts; document layouts; or other aspects of the output 112. It should be understood, however, that the "worlds" are not necessarily limited to templates. Rather, in the embodiments described herein, the worlds are not templates and instead define facets or aspects of visualizations that can be applied to the data 110 to obtain the output 112 as described herein. For example, in some embodiments a "world" includes a conglomeration of visualizations, styles, and tuned rules that guide how the data 110 is to be handled and displayed. Additional aspects of the worlds disclosed herein are described in additional detail below with reference to FIG. 2.

Some or all of the worlds also can be associated with a set of rules. Additional aspects of the rules are described in detail below with reference to FIG. 2. Briefly, the rules can define how the various aspects of the worlds are to be applied to data such as the data 110. Some additional aspects of the rules and some examples of how the rules can be used are set forth below in more detail with reference to FIG. 2. The computing device 102 can be configured to obtain rules associated with a chosen world, if available, and to apply those rules to the data 110 to obtain the output 112. The computing device 102 can thus generate the output 112 and present the output 112 to a user or other entity. The output 112 also can be saved to data storage device, if desired.

According to some embodiments of the concepts and technologies disclosed herein, the computing device 102 also is configured to obtain and apply user feedback to the output 112. In some embodiments, the user feedback includes user responses to various prompts or questions. For example, the computing device 102 can present questions to a user or other entity for evaluating various aspects of the output 112. In some embodiments, the computing device 102 asks or prompts a user or other entity for feedback regarding colors, color schemes, fonts, layouts, element locations, image sizes, importance, emphasis, arrangement of data, or other aspects of the output 112 by expressing whether that particular aspect is liked or disliked.

The computing device 102 also can be configured to generate questions for the user about the various aspects of the output 112 in addition to, or instead to, prompting for feedback. For example, the computing device can ask if a particular aspect is liked or disliked, is good or bad, or the like. It should be understood that the feedback, questions, prompts, or the like can be formatted as questions with binary yes/no, like/dislike, or true/false answers. The questions or prompts also can request rankings over various ranges such as, for example, scales of numbers such as one to ten, letter grades such as "A" through "F," numbers of stars, or the like. The user can provide this and/or other types of feedback with respect to the entirety of the output 112 and/or the computing device 102 can be configured to ask the user to express this feedback regarding individual parts or components of the output 112. For example, the computing device 102 can be configured to ask if the output 112 is liked or disliked, or to ask if a particular font, color scheme, and/or other aspect or component of the output 112 is liked or disliked. It should be understood that these embodiments are illustrative, and should not be construed as being limiting in any way.

The computing device 102 can be configured to evaluate the feedback from the user and to determine if the output 112 is to be modified based upon the feedback. For example, if feedback received from the user or another entity indicates that a color scheme is "disliked," the computing device 102 can change the color scheme. Similarly, "likes" can be used to modify the output 112 so aspects of the output 112 that are liked by the user or other entity can be repeated in the output 112 and/or can be used for generating other output 112 in the future. As such, it can be appreciated that various aspects of the output 112 can be modified based upon the feedback. It should be understood that these embodiments are illustrative, and should not be construed as being limiting in any way.

FIG. 1 illustrates one computing device 102, one network 104, and one data source 114. It should be understood, however, that some implementations of the operating environment 100 include multiple computing devices 102, multiple networks 104, zero or multiple data sources 114 and/or additional or alternative hardware elements. Thus, the illustrated embodiments should be understood as being illustrative, and should not be construed as being limiting in any way.

Figure 2:
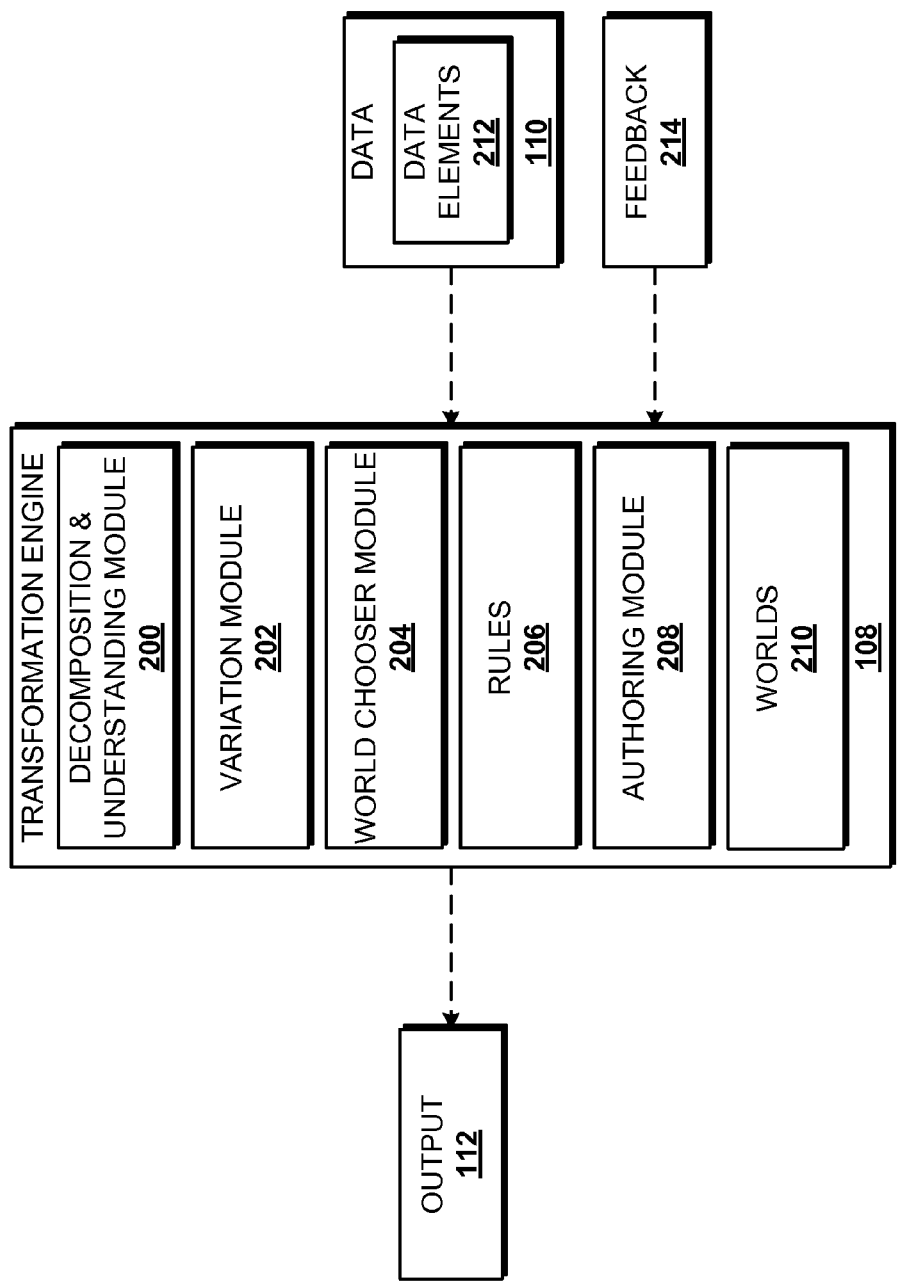
FIG. 2 is a block diagram showing additional aspects of a transformation engine, according to an illustrative embodiment.

Turning now to FIG. 2, additional aspects of the transformation engine 108 will be described in detail, according to an illustrative embodiment. As explained above with reference to FIG. 1, the transformation engine 108 can be configured to transform the data 110 into the output 112. In some embodiments, such as the embodiment illustrated in FIG. 2, the transformation engine 108 includes a number of modules, applications, programs, software, or other computer-executable instructions for providing the functionality described herein with respect to the transformation engine 108 and/or the computing device 102. Additionally, or alternatively, the transformation engine 108 also can include other data as will be described herein in more detail.

In the illustrated embodiment, the transformation engine 108 includes a decomposition and understanding module 200, a variation module 202, a world chooser module 204, rules 206, an authoring module 208, worlds 210, and other data or instructions (not shown). Although not shown in FIG. 2, the transformation engine 108 also can include a design rules module for authoring, creating, and/or saving the rules 206. As such, the transformation engine 108 can be configured to transform the data 110 into the output 112 via execution of one or more portions of computer-executable code or instructions. It should be understood that the various functionality described herein with respect to the various modules and other data shown in FIG. 2 can be provided by a single application, module, program, or other software or data, and that as such, the illustrated embodiment is illustrative and should not be construed as being limiting in any way.

The decomposition and understanding module 200 can be configured to analyze the data 110. As explained above, the analysis of the data 110 can be completed to understand relationships between the various data elements or other portions of the data 110. More particularly, in some embodiments the data 110 is arranged in a flow-based format and/or is not arranged in any particular format. The decomposition and understanding module 200 can apply various rules for interpreting the data 110 to identify relationships between the various data. For example, if multiple pages of a presentation or other document include a similar or identical title, the decomposition and understanding module 200 can be configured to determine that the multiple pages are related to one another. Similarly, if a title on one page is similar to a title on the second page but also includes the word "continued" or an abbreviation such as "cont'd," the decomposition and understanding module 200 can determine that these pages are related. It should be understood that these embodiments are illustrative, and should not be construed as being limiting in any way.

In some embodiments, the decomposition and understanding module 200 can be configured to determine that elements in bullet lists or numbered lists are related to one another and/or to a heading of the lists. In some other embodiments, the decomposition and understanding module 200 can be configured to determine that text surrounding the same or similar images is related; that text with similar or identical references or footnotes are related; and/or that other elements or portions of the data 110 are related to one another. In some other embodiments, decomposition and understanding can include image analysis. For example, images can be analyzed to detect faces, salient regions, invariant regions (over which text can be placed), compositional analysis, or other aspects of the image. Various rules for interpreting the data 110 can be applied by the decomposition and understanding module 200. Because other processes or rules for identifying relationships are contemplated, it should be understood that these embodiments are illustrative, and should not be construed as being limiting in any way.

The variation module 202 can be configured to generate differentiated output 112 for the user or other entity. In particular, the variation module 202 can apply variations in animations, visual effects, designs, themes, or other variations. The variations can be applied to the data 110 to create differentiations that can be used to make each output 112 of the computing device 102 seem unique. These variations can be applied to the data 110, as described in more detail below with reference to FIG. 3.

The world chooser module 204 can be configured to evaluate and choose a world to apply to the data 110. As explained above, a "world" can include a theme, model, scheme, or other approach for presenting data that can be stored, selected, and/or applied to data 110 to obtain output 112. In some embodiments, the worlds are extensible. In particular, a third party or other entity can create new or additional worlds 210 and can define how the data 110 can be applied to the world 210. The world chooser module 204 can be configured to consider various aspects of the data 110 and to determine what visualization models and/or differentiations to apply to the data 110 based upon the determined world 210 that best fits the data 110. In some embodiments, the worlds 210 are stored by the transformation engine 108, as shown in FIG. 2. The world chooser module 204 can consider, for example, the shape of the data 110, hierarchies identified within the data 110, and other aspects of the data 110.

As mentioned above, the data 110 can include various data elements 212. Thus, while various operations and/or analyses are described herein with respect to the data 110, it should be understood that these and/or other operations can be taken with respect to the data elements 212. Thus, the world chooser module 204 can, for example, consider relationships between and/or hierarchies among the data elements 212 to select the world 210. These and other aspects of selecting a world 210 are set forth below in further detail with reference to FIG. 3.

The rules 206 can include adaptive rules that are configured to convert the data 110, which can include arbitrary content, into the output 112 based upon the variations and the world 210 chosen. In other words, the rules 206 can include categories of translations that can be applied to the data 110 to obtain the output 112. Thus, in some embodiments the rules 206 include one or more sets of rules for each world 210, and the rules 206 are selected by the computing device 102 based upon which world 210 is chosen. As such, the rules 206 can be tailored operations, steps, or rules for converting or translating the data 110 into the output 112. It should be understood that the data 110 may not always be a direct translation into the output 112. In particular, the content or layout of the data 110 may be manipulated during translation of the data 110 into the output 112. It should be understood that this embodiment is illustrative, and should not be construed as being limiting in any way.

The rules 206 can be used to select portions of the data 110, for example the data elements 212 described in more detail below, that are to be included in a layout or other form of the output 112. In particular, the rules 206 can be used to select the information or data elements 212 for each view in the output 112 and to define what type of information and/or what data elements 212 are needed, desired, or appropriate at any given location within a layout, view, or other output 112 associated with the chosen world. Developers or other entities can specify, by way of the rules 206, what information is to be presented in each view or layout.

The rules 206 also can be used to determine a flow, progression, and/or layout of the data elements 212 or other information selected for the output 112. In particular, the computing device 102 can apply the rules 206 to provide decision-making capability when the transformation engine 110 generates layouts associated with the output 112. The layouts can define what types of information or data elements 212 are used in what grid cells on the screen (or defining location of the data elements 212 using other approaches for placing the data elements 212 on the screen), while the rules 206 can define how the information flows or is modified (stylistically or otherwise, for example the size, shape, or other aspect of the information) once the information is placed in the layout. In some cases, the rules 206 also can handle how the layout is adjusted if information flows beyond the predefined default layout.

The rules 206 also can be applied to the data 110 to upgrade or otherwise modify one or more of the data elements 212 or other information to be included in the output 112. It therefore can be appreciated that the flow handling behavior of a world for any type of data 110 can be changed by modifying the rules 206 associated with the world. In particular, the rules 206 can be used to improve, upgrade, or otherwise modify data elements 212 or other portions of the data 110. For example, if a data element 212 includes a low-resolution image, upgrading the data element 212 can include replacing the low-resolution image with an image having a higher resolution, applying image treatments such as blur or the like to the image to create an artistic representation, or the like. Similarly, if the data element 212 includes a data table, upgrading or improving the data element 212 can include replacing the data table with a graph. These and/or other types of upgrades, improvements, and/or other modifications can be controlled by the rules 206. Thus, a designer can be given the ability to articulate how specific types of information will be upgraded or otherwise modified using an available set of tools such as upgrading an image, converting to a graph, etc. In some embodiments, the designer can articulate the various rules 206 prior to the application of the rules 206 as described herein. As such, it should be understood that the articulation of the rules 206 can occur at almost any time and that the utilization of the rules 206 can occur at almost any time, including long after the rules 206 have been articulated. It should be understood that these embodiments are illustrative, and should not be construed as being limiting in any way.

The rules 206 also can be applied to the data 110 to score one or more layouts or other forms of the output 112. In particular, the rules 206 can be used to facilitate selection of a layout by providing feedback regarding how information handled for a given layout and whether a quality bar has been met. Accurate scores for each layout within a world can be obtained and the scores can be adjusted through a set of rules 206 without recompilation of the codebase.

The rules also can be used to score the various worlds considered by the transformation engine 108 and the scores can be passed to the world chooser module 208 for scoring the worlds under consideration. In particular, the rules 206 can be used to facilitate selection of one of the worlds by generating feedback regarding quality of fit of information being placed in the world. The rules 206 may not make a final decision about world ranking, but can be a component that provides information to help make the decision. Accurate scores for each world that describes the fit of the world for the information set can be obtained, and the scores can be adjusted using a set of rules 206 without recompilation of the codebase.

According to various implementations of the transformation engine 108, the rules 206 can be created, modified, and/or deleted by designers, users, or other entities. As such, the rules 206 can be accessible to designers to articulate the rules 206 in a way that fits with the designers' workflow. In some embodiments, tools for allowing the designer to articulate all of the necessary information, ideally in a visual way, to address the prior goals in this list. Additional aspects of the rules 206 are described herein, and as such, the above uses of the rules 206 should be understood as being illustrative and should not be construed as being limiting in any way.

Thus, the rules 206 can be applied to adjust how the data 110 is presented by application of a particular world. For example, the rules 206 can be applied to the data 110 to adjust the readability of text. These adjustments can be based, for example, upon a relative ease with which a typeface can be read when characters are laid out in words, sentences, and paragraphs, upon an assumption that long blocks of text need to be readable to hold the reader and/or to boost comprehension, upon an assumption that setting text in columns can provide short line length, which can improve readability, upon rules that assume that text set with 'ragged right' alignment is more readable than text that is 'force justified' or manipulated to line up on the left and right margins, upon rules for introducing white space, subheads, and/or other elements to divide text to give eyes of a reader resting places to help prevent fatigue, by adjusting leading based on number of lines of text, by adjusting line length based on amount of content and layout, by adjusting the content based upon capabilities of a device used to view the content (e.g., screen size, resolution, input devices, or the like), by adjusting font size based on an amount of content, and/or by applying other adjustments or modifications to the data. It should be understood that this embodiment is illustrative, and should not be construed as being limiting in any way.

The rules 206 also can be used to improve the legibility of the output 112. For example, the rules 206 can be used to evaluate how easily one letter can be distinguished from another, or a clarity associated with a typestyle. The rules 206 also can be used to overlay transparent fields so text is legible, to overlay semi-transparent backgrounds behind text, so the text is more legible than without the semi-transparent backgrounds, to apply rules for darkening and/or lightening images and/or portions thereof, to adjust font size to improve and/or insure legibility, to add drop shadow to make text more legible, by repositioning and/or scaling images to place in regions of a layout such that space for text is left to improve legibility of the text, to add subtle transparency behind text, to apply photo darkening to transform the image, to apply other adjustments, or the like.

The rules 206 also can be used to improve the quality of the output 112. For example, the rules 206 can be used to align text on gridlines and/or adjusting placement of the text so the text visually lines up on the grid, to define text size relationships so that text is optimized for body copy and title copy overlaid on an image, by adjusting leading based on a number of lines of text, by applying text kerning, text leading, baseline alignment of text of various sizes, and the like. The rules 206 also can be used to identify structure in photos so that photos overlaying content relate to the underlying structure in the photo. Similarly, the rules 206 can be used to ensure that text blocks align with one another and/or with other text such that the text blocks flow together to ensure proper placement, alignment, depending on variable strings. It should be understood that these embodiments are illustrative, and should not be construed as being limiting in any way.

The rules 206 also can be used to adjust images. For example, the rules 206 can be used to provide cropping of images based on one or more salient regions, to upgrade images, to crop and/or avoid cropping images in one or more directions and/or to maintain image orientations.

The rules 206 also can be used to search for and/or generate a summarization of the data 110. The rules 206 also can be used to upgrade the data 110 and/or data elements 212, for example, by using global positioning system ("GPS") or map data to obtain additional information about the places/locations referenced in the data 110, to add current statistics and/or other types of live content, to add related information such as a number of comments, a number of times the content has been linked to, a number of times the content has been downloaded, or the like. The rules 206 also can be used to size the data 110 and/or data elements 212. These embodiments are illustrative and should not be construed as being limiting in any way.

The rules 206 also can be used to affect how each data element 212 moves relative to other data elements 212. For example, some text may react when interacted with and/or hovered over, movement or animation may be affected by speed of movement or what user is interacting with the data 110, ambient motion can be applied until a click or touch gesture is detected, or the like. These and other movements and/or relative positioning of the data elements 212 can be determined by the rules 206. The rules 206 also can be used to determine orders of the data elements 212, how content is navigated to (e.g., a number of clicks, swipes, screens to navigate through, or the like).

As mentioned above, the rules 206 also can be used to create variations in the data elements 212 and/or other portions of the data 110. The rules 206 can apply some variations based upon what data 110 or data elements 212 surround a particular data portion or data element 212. The variations also can be based upon the content. For example, if the data 110 corresponds to timeline-based data, the world or layout can be chosen based upon an assumption or recognition that few images are included. It should be understood that this embodiment is illustrative, and should not be construed as being limiting in any way.

The rules 206 also can be used to select, size, and/or otherwise format typefaces and/or other settings associated with text. For example, the rules 206 can be used to select a highlight color and/or complimentary colors for text or fields nearby. The rules 206 also can be used to define a color palette based upon on a source of the content. For example, a color scheme can be selected based upon a color scheme associated with a particular brand, color schemes included in the data 110, or the like. Motion also can be varied and/or selected based upon the rules 206. It should be understood that these embodiments are illustrative, and should not be construed as being limiting in any way.

The authoring module 208 can be configured to analyze feedback 214 regarding the output 112 from a user or other entity. The feedback 214 can be obtained by the authoring module 208 and/or can be obtained by the transformation engine 108 and passed to the authoring module 208. The authoring module 208 can be configured to apply the feedback 214 to the output 112 to modify the output 112. The authoring module 208 also can be configured to store the feedback 214 for future uses of the transformation engine 108.

Thus, although not shown in FIGS. 1-2, it should be understood that user preferences can be developed by the transformation engine 108 and can be stored and applied by the transformation engine 108, if desired. As explained above with regard to modifying output 112 based upon feedback 214, the authoring module 208 can be configured to prompt for the feedback 214 or can be configured to receive the feedback 214 from a user or other entity. The feedback 214 can be provided in terms of likes or dislikes, as yes/no or true/false answers to questions, as rating information such as numbers of stars, numbers within ranges, letter grades, through extrapolation of simple actions such as selection or reordering, or the like. The feedback 214 can be interpreted by the authoring module 208.

As noted above, in addition to changing the output 112 based upon dislikes, the authoring module 208 also can be configured to modify the output 112 based upon likes. In particular, the transformation engine 108 can repeat and/or use more often various aspects of the output 112 that are liked by users. It should be understood that a user's likes or dislikes also can be used by the transformation engine 108 for other users. In particular, the transformation engine 108 can be configured to recognize similarities between and/or among various users based upon preferences, based upon social networking information, and/or based upon other information, and that the transformation engine 108 can apply a particular user's preferences to another user who is considered to be or is indicated as being similar to the user. It should be understood that these embodiments are illustrative, and should not be construed as being limiting in any way.

In light of the above description of FIG. 2, it should be understood that the computing device 102 described herein can provide the functions of the transformation engine 108 and/or the various modules of the transformation engine 108 by execution of any number of applications, software components, modules, or other instructions. As such, when the specification refers to functions of the "computing device," it should be understood that the functionality described can include functionality provided by any of the software modules, data, and/or hardware elements described herein. Furthermore, it should be understood that the transformation engine 108 can operate as a technology layer that is called or accessed by various programs executing at the computing device 102. Similarly, the transformation engine 108 can be operated as a service that can be called by various applications or devices. As such, the various described embodiments are illustrative and should not be construed as being limiting in any way.

Figure 3:
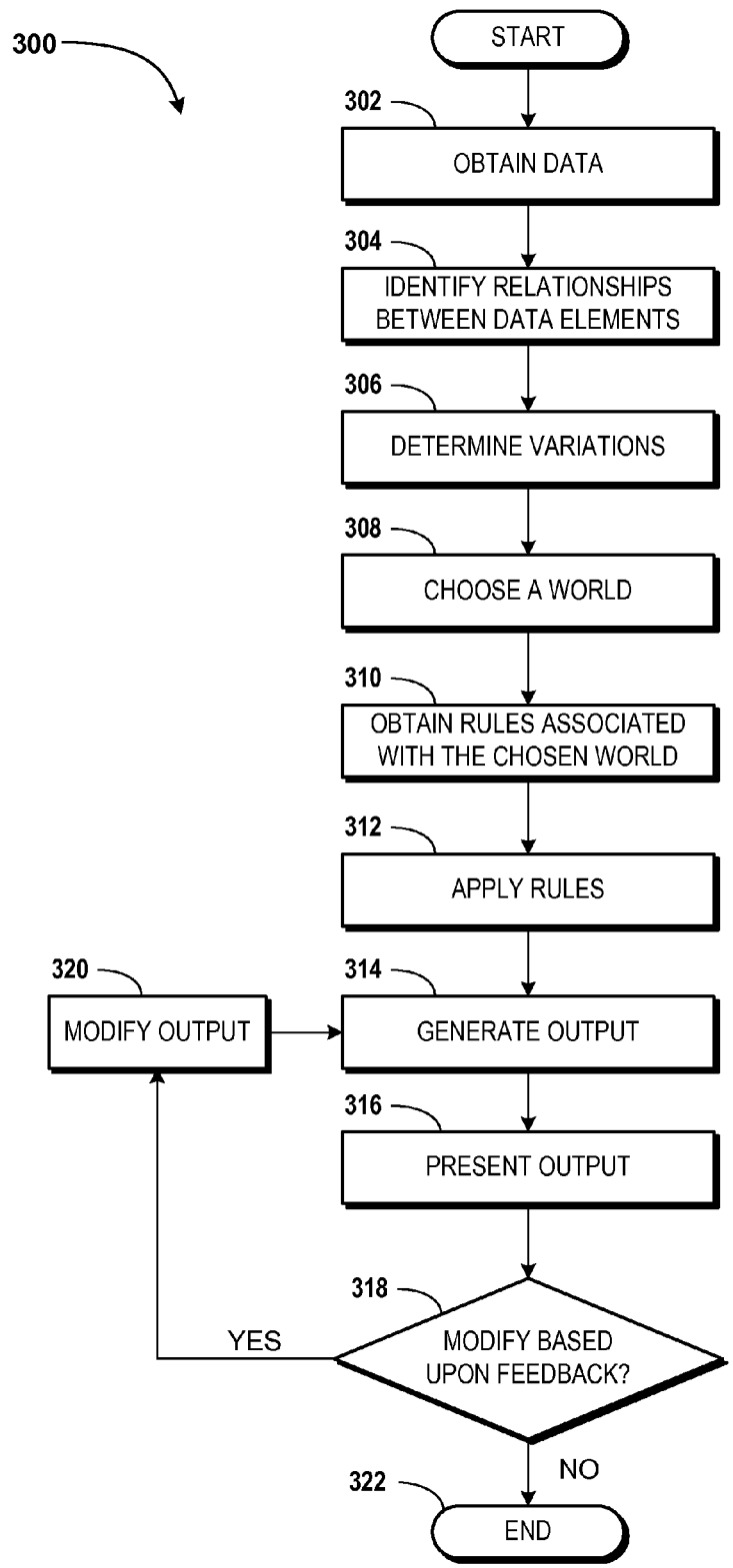
FIG. 3 is a flow diagram showing aspects of a method for transforming data into consumable content, according to an illustrative embodiment.

Turning now to FIG. 3, aspects of a method 300 for transforming data into consumable content will be described in detail. It should be understood that the operations of the method 300 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 300 can be ended at any time and need not be performed in its entirety. Some or all operations of the method 300, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (3) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 300 disclosed herein is described as being performed by the computing device 102 via execution of computer executable instructions such as, for example, the transformation engine 108. As explained above with regard to FIG. 2, the transformation engine 108 can include several modules and/or other data that can be executed and/or used by the computing device 102 to provide the functionality described herein. It should be understood that additional or alternative devices can provide the functionality described herein via execution of instructions other than, or in addition to, the transformation engine 108. As such, it should be understood that these embodiments are illustrative, and should not be viewed as being limiting in any way.

The method 300 begins at operation 302, wherein the computing device 102 obtains the data 110. As explained above, the data can include various types of information or content such as, for example, media files including, but not limited to, video files, animation files, slide show files, image files, audio files, other media files, or the like; text documents; plain text; web pages, web content, rich text, or the like; and/or other types of information. In one contemplated embodiment, the data 110 corresponds to a presentation file such as a file generated by a member of the MICROSOFT POWERPOINT family of presentation software products from Microsoft Corporation in Redmond, Wash. In light of the various types of information that can be provided as the data 110, it should be understood that this embodiment is illustrative, and should not be construed as being limiting in any way.

According to various implementations, the data 110 is obtained from a data storage device or component associated with the computing device 102. Some examples of data storage devices are described in more detail below with reference to FIGS. 4-6. In some other embodiments, the data 110 can be stored at a remote storage device or resource such as the data source 114 described herein. Thus, the data 110 can be obtained by the computing device 102 via communications with the data source 114. As such, it should be understood that the data 110 can be obtained from any real or virtual device via a direct connection, via one or more networks, and/or via other nodes, devices, and/or device components.

From operation 302, the method 300 proceeds to operation 304, wherein the computing device 102 can identify relationships between data elements or other portions of the data 110. Some types of information, and some embodiments of the data 110, can be arranged or organized in a flow-based arrangement and/or otherwise may not be arranged in a logical and/or hierarchical arrangement. For example, each slide or page of a document such as a word processing document or a presentation may include data elements 212 such as a title, one or more paragraphs of text, one or more sentences, one or more words, one or more bullet points, one or more numbered lists, one or more tables, one or more images, and/or other objects. In some instances, each slide or page can be directed to or addresses a different topic or sub-topic. In some other instances, each slide or page can be directed to a same or similar topic. Operation 304 can include determining and identifying relationships between the various data elements 212 or other portions of the data 110. In some embodiments, the computing device 102 provides the functionality described herein with respect to operation 304 via execution of the decomposition and understanding module 200. It should be understood that this embodiment is illustrative, and should not be construed as being limiting in any way.

In one contemplated example, a ten-page document can include a title on each page. The title can be indicated by a block or field that is labeled "title" and/or can be determined to include a title based upon the location, formatting, size, color, contents, or other aspect of the information. Thus, if three of the ten pages include the same or similar title information, the three pages can be considered to be related and information on the three pages can be determined to share a relationship to the title. In another example, the computing device 102 can be configured to consider a numbered list or bulleted list under a heading as being related to the heading. Similarly, the computing device 102 can be configured to consider numbered or bulleted items within the lists as being related to one another.

Thus, it can be appreciated that the location, size, format, content, and/or other aspects of text, images, or other data, as well as relative position, location, format, size, contents, or other aspects of the data, relative to other data in the documents, can be used to determine relationships between the data in operation 304. Because many other approaches for identifying relationships between various data elements or other portions of the data 110 are contemplated, it should be understood that these embodiments are illustrative, and should not be construed as being limiting in any way.

From operation 304, the method 300 proceeds to operation 306, wherein the computing device 102 determines variations to apply to the data 110. In operation 306, the computing device 102 can examine the relationships determined in operation 304 to determine how the data 110 is to be presented. In particular, the computing device 102 can examine various factors associated with the data 110 and determine how to add variations to the data 110. Thus, for example, the computing device 102 can determine visual effects, designs, and/or other variations that can be applied to the data 110 to present the relationships determined in operation 304 in various ways. In one contemplated embodiment, the computing device 102 provides the functionality described herein with respect to operation 306 via execution of the variation module 204. It should be understood that this embodiment is illustrative, and should not be construed as being limiting in any way.

From operation 306, the method 300 proceeds to operation 308, wherein the computing device 102 chooses a world 210 for presenting the data 110. As mentioned above, the term "world" as used herein can include a type of visualization and/or theme that can be applied to the data 110 and used to generate the output 112. In operation 308, the computing device 102 can select a world 210 based upon the various aspects of the data 110, the variations identified in operation 306, relationships between the data elements 212, and/or based upon other considerations. For example, the computing device 102 can be configured to examine a shape of the data 110 such as, for example, an overall mood or tone of the data 110; a length of the data 110 such as a presentation or document; a text to image ratio of the data 110; a number of images or other media objects in the data 110; a total number of text characters, words, sentences, paragraphs, or the like in the data 110; an expected audience of the output 112; an expected venue for viewing the output 112; an expected display medium such as a display device expected to be used to view the output 112; a location at which the output 112 may be viewed; hierarchies within the data 110 and/or among data elements 212; input mechanisms that may be used when viewing or interacting with the output 112; relative sizes of the visual objects or other data elements 212 such as text, images, or the like; and/or other aspects of the data 110.

In selecting a world 210, the computing device 102 can consider a number of worlds 210 or can identify a single world 210 that fits the data 110 and/or the determined relationships, hierarchies, mood, shape, and/or other aspects of the data 110 and/or the data elements 212. Thus, operation 308 can include selecting a highest-ranked world 210 from a number of available worlds 210, identifying a single world 210 based upon the variations, or receiving input specifying a particular world 210. In one contemplated embodiment, the computing device 102 provides the functionality described herein with respect to operation 308 via execution of the world chooser module 208. It should be understood that this embodiment is illustrative, and should not be construed as being limiting in any way.

From operation 308, the method 300 proceeds to operation 310, wherein the computer device 102 obtains rules 206 associated with the chosen world 210. In operation 310, the computing device 102 can apply the rules 206 associated with the selected world 210 to the data 110. Via application of the rules 206 to the data 110, the computing device 102 can be configured to present the data 110 in a designed way. In particular, the rules 206 can specify how data 110 is to be presented in a particular world 210. Thus, operation 310 can include obtaining the rules 206 based, at least partially, upon the world 210 chosen in operation 308.

From operation 310, the method 300 proceeds to operation 312, wherein the computer device 102 applies the rules 206 obtained in operation 310. As mentioned above, the computing device 102 can apply the rules 206 to the data 110 to format the data 110 in a format or form associated with the world 210 chosen in operation 308. For example, a rule 206 can define a font in which text is to be presented, a size for displayed images, or other instructions for modifying the data 110 to obtain the output 112. It should be understood that this embodiment is illustrative, and should not be construed as being limiting in any way.

From operation 312, the method 300 proceeds to operation 314, wherein the computer device 102 generates the output 112. In operation 314, the computing device 102 can apply the variations, world 210, and rules 206 identified in operations 306-312 to the data 110. From operation 314, the method 300 proceeds to operation 316, wherein the computer device 102 presents the output 112. The output 112 can be presented, for example, on a display device associated with the computing device 102 and/or another device. In some embodiments, the computing device 102 can be configured to save the output 112 to a data storage device for later viewing or presentation, although such an operation is not shown in FIG. 3. For purposes of describing the various embodiments of the concepts and technologies disclosed herein, the method 300 is described with respect to an embodiment in which the output 112 is displayed on a display device associated with the computing device 102. It should be understood that this embodiment is illustrative, and should not be construed as being limiting in any way.

From operation 316, the method 300 proceeds to operation 318, wherein the computer device 102 determines if the output 112 is to be modified based upon feedback 214 received at the computing device 102. Thus, while not shown in FIG. 3, the method 300 can include an operation for receiving feedback 214 at the computing device 102 and/or for prompting a user or other entity for feedback regarding the output 112. In some embodiments, for example, the output 112 is presented and a user is prompted for feedback 214 regarding the output 112. For example, a user may be asked if the output 112 is visually appealing, if a particular color is liked or disliked, if the layout of the elements is liked or disliked, and/or other questions. In some embodiments, the computing device 102 receives feedback 214 and/or comments regarding almost any aspect of the output 112.

In response to the feedback 214 received at the computing device 102, the computing device 102 can determine that the output 112 is to be modified. For example, the computing device 102 can determine that a color, a layout, a color scheme, a theme, a mood, or other aspect of the output 112 is to be modified in response to the feedback 214. It should be understood that in determining that the output 112 is to be modified, the computing device 102 can determine that the variations determined in operation 306 and/or the world 210 chosen in operation 308 may be changed, among other aspects of the output 112. Because almost any aspect of the output 112 can be changed, it should be understood that these embodiments are illustrative, and should not be construed as being limiting in any way.

If the computing device 102 determines, in operation 318, that the output 112 is to be modified, the method 300 proceeds to operation 320, wherein the computing device 102 modifies the output 112. As mentioned above, the modifications to the output 112 can include resizing text, resizing images, changing formats of text or images, changing text fonts, sizes, or colors, changing worlds 210, changing visualization modes, changing variations or types of variations, and/or otherwise modifying the output 112. Because additional or alternative modifications can be made to the output 112, it should be understood that these embodiments are illustrative, and should not be construed as being limiting in any way.

From operation 318, the method returns to operation 314, wherein the output 112 is again generated by the computing device 102. A such, it can be appreciated that operations 314-320 of the method 300 can be repeated until, in any iteration of operation 316, the computing device 102 determines that the output 112 is not to be modified. If the computing device 102 determines that the output 112 is not to be modified, the method 300 proceeds to operation 322. The method 300 ends at operation 322.

Figure 4:
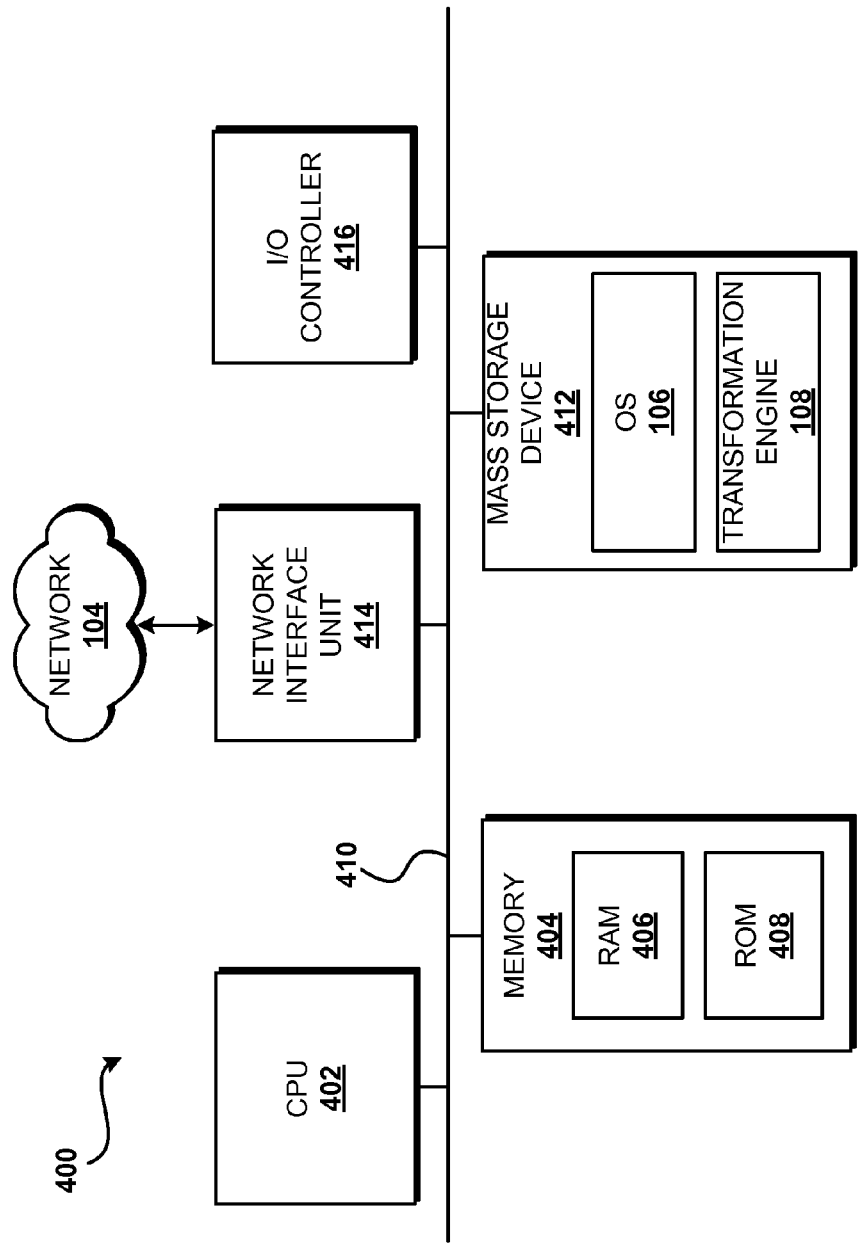
FIG. 4 is a computer architecture diagram illustrating an illustrative computer hardware and software architecture for a computing system capable of implementing aspects of the embodiments presented herein.

FIG. 4 illustrates an illustrative computer architecture 400 for a device capable of executing the software components described herein for transforming data into consumable content. Thus, the computer architecture 400 illustrated in FIG. 4 illustrates an architecture for a server computer, mobile phone, a PDA, a smart phone, a desktop computer, a netbook computer, a tablet computer, and/or a laptop computer. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing the operating system 106 and one or more application programs including, but not limited to, the transformation engine 108. Although not shown in FIG. 4, the mass storage device 412 also can be configured to store the data 110, the output 112, the rules 206, the worlds 210, the data elements 212, the feedback 214, and/or other applications, modules, or other information described herein.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes the claims, the phrase "computer storage medium" and variations thereof, does not include waves, signals, and/or other transitory and/or intangible communication media, per se.

According to various embodiments, the computer architecture 400 may operate in a networked environment using logical connections to remote computers through a network such as the network 104. The computer architecture 400 may connect to the network 104 through a network interface unit 414 connected to the bus 410. It should be appreciated that the network interface unit 414 also may be utilized to connect to other types of networks and remote computer systems, for example, the data source 114. The computer architecture 400 also may include an input/output controller 416 for receiving and processing input from a number of other devices, including a keyboard, mouse, or electronic stylus (not shown in FIG. 4). Similarly, the input/output controller 416 may provide output to a display screen, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Figure 5:
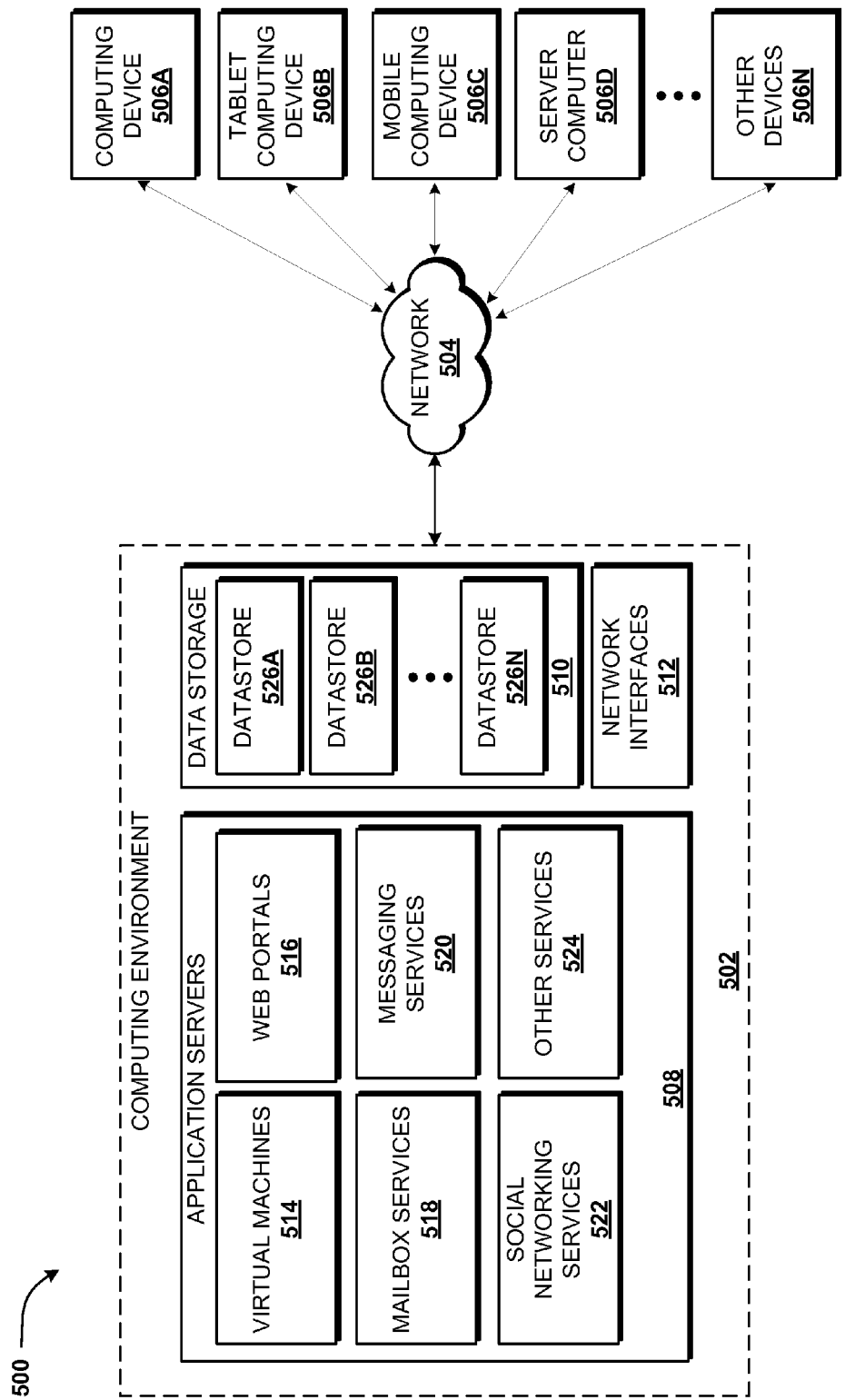
FIG. 5 is a diagram illustrating a distributed computing environment capable of implementing aspects of the embodiments presented herein.

FIG. 5 illustrates an illustrative distributed computing environment 500 capable of executing the software components described herein for transforming data into consumable content. Thus, the distributed computing environment 500 illustrated in FIG. 5 can be used to provide the functionality described herein with respect to the computing device 102. The distributed computing environment 500 thus may be utilized to execute any aspects of the software components presented herein.

According to various implementations, the distributed computing environment 500 includes a computing environment 502 operating on, in communication with, or as part of the network 504. The network 504 also can include various access networks. According to various implementations, the functionality of the network 504 is provided by the network 104 illustrated in FIGS. 1 and 4. One or more client devices 506A-506N (hereinafter referred to collectively and/or generically as "clients 506") can communicate with the computing environment 502 via the network 504 and/or other connections (not illustrated in FIG. 5). In the illustrated embodiment, the clients 506 include a computing device 506A such as a laptop computer, a desktop computer, or other computing device; a slate or tablet computing device ("tablet computing device") 506B; a mobile computing device 506C such as a mobile telephone, a smart phone, or other mobile computing device; a server computer 506D; and/or other devices 506N. It should be understood that any number of clients 506 can communicate with the computing environment 502. Two example computing architectures for the clients 506 are illustrated and described herein with reference to FIGS. 4 and 6. It should be understood that the illustrated clients 506 and computing architectures illustrated and described herein are illustrative, and should not be construed as being limited in any way.

In the illustrated embodiment, the computing environment 502 includes application servers 508, data storage 510, and one or more network interfaces 512. According to various implementations, the functionality of the application servers 508 can be provided by one or more server computers that are executing as part of, or in communication with, the network 504. The application servers 508 can host various services, virtual machines, portals, and/or other resources. In the illustrated embodiment, the application servers 508 host one or more virtual machines 514 for hosting applications or other functionality. According to various implementations, the virtual machines 514 host one or more applications and/or software modules for providing the functionality described herein for transforming data into consumable content. It should be understood that this embodiment is illustrative, and should not be construed as being limiting in any way. The application servers 508 also host or provide access to one or more Web portals, link pages, Web sites, and/or other information ("Web portals") 516.

According to various implementations, the application servers 508 also include one or more mailbox services 518 and one or more messaging services 520. The mailbox services 518 can include electronic mail ("email") services. The mailbox services 518 also can include various personal information management ("PIM") services including, but not limited to, calendar services, contact management services, collaboration services, and/or other services. The messaging services 520 can include, but are not limited to, instant messaging services, chat services, forum services, and/or other communication services.

The application servers 508 also can include one or more social networking services 522. The social networking services 522 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 522 are provided by or include the FACEBOOK social networking service, the LINKEDIN professional networking service, the MYSPACE social networking service, the FOURSQUARE geographic networking service, the YAMMER office colleague networking service, and the like. In other embodiments, the social networking services 522 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 522 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 522 are not mentioned herein for the sake of brevity. As such, the above embodiments are illustrative, and should not be construed as being limited in any way.

As shown in FIG. 5, the application servers 508 also can host other services, applications, portals, and/or other resources ("other resources") 524. It thus can be appreciated that the computing environment 502 can provide integration of the concepts and technologies disclosed herein provided herein for transforming data into consumable content with various mailbox, messaging, social networking, and/or other services or resources. For example, the concepts and technologies disclosed herein can be used to transform social networking data or mailbox data into visual content for a user. Similarly, the concepts and technologies disclosed herein can be used to transform messaging or other resources into visual content. It should be understood that these embodiments are illustrative, and should not be construed as being limiting in any way.

As mentioned above, the computing environment 502 can include the data storage 510. According to various implementations, the functionality of the data storage 510 is provided by one or more databases operating on, or in communication with, the network 504. The functionality of the data storage 510 also can be provided by one or more server computers configured to host data for the computing environment 502. The data storage 510 can include, host, or provide one or more real or virtual datastores 526A-526N (hereinafter referred to collectively and/or generically as "datastores 526"). The datastores 526 are configured to host data used or created by the application servers 508 and/or other data. Although not illustrated in FIG. 5, the datastores 526 also can host or store the data 110, the output 112, the rules 206, the worlds 210, the data elements 212, the feedback 214, and/or other data, computer executable instructions, or other information described herein.

The computing environment 502 can communicate with, or be accessed by, the network interfaces 512. The network interfaces 512 can include various types of network hardware and software for supporting communications between two or more computing devices including, but not limited to, the clients 506 and the application servers 508. It should be appreciated that the network interfaces 512 also may be utilized to connect to other types of networks and/or computer systems.

It should be understood that the distributed computing environment 500 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 500 provides the software functionality described herein as a service to the clients 506. It should be understood that the clients 506 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 500 to utilize the functionality described herein for transforming data into consumable content.

Figure 6:
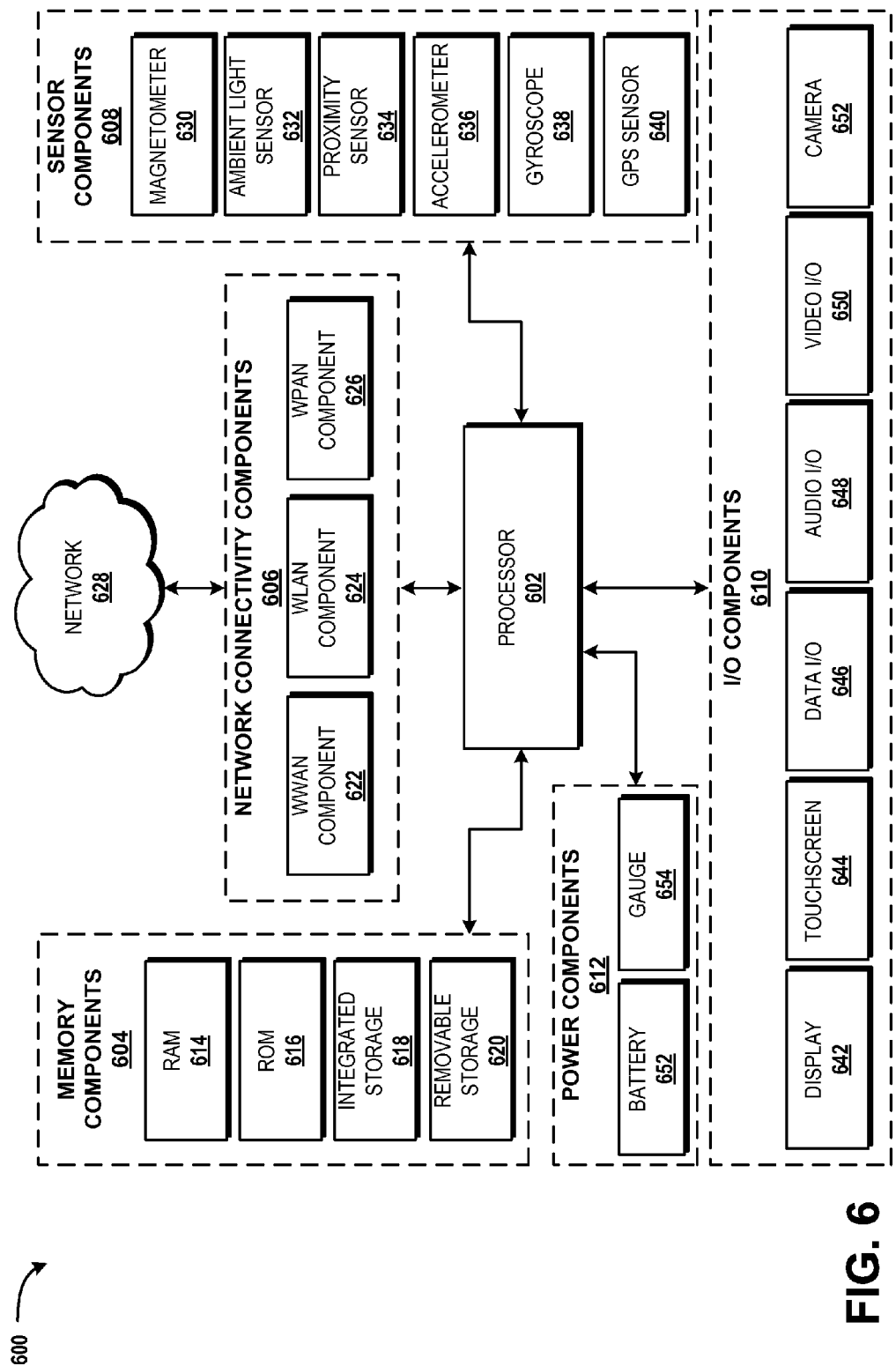
FIG. 6 is a computer architecture diagram illustrating a computing device architecture capable of implementing aspects of the embodiments presented herein.

Turning now to FIG. 6, an illustrative computing device architecture 600 for a computing device that is capable of executing various software components described herein for transforming data into consumable content. The computing device architecture 600 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 600 is applicable to any of the clients 606 shown in FIG. 5. Furthermore, aspects of the computing device architecture 600 may be applicable to traditional desktop computers, portable computers (e.g., laptops, notebooks, ultra-portables, and netbooks), server computers, and other computer systems, such as described herein with reference to FIG. 4. For example, the single touch and multi-touch aspects disclosed herein below may be applied to desktop computers that utilize a touchscreen or some other touch-enabled device, such as a touch-enabled track pad or touch-enabled mouse.

The computing device architecture 600 illustrated in FIG. 6 includes a processor 602, memory components 604, network connectivity components 606, sensor components 608, input/output components 610, and power components 612. In the illustrated embodiment, the processor 602 is in communication with the memory components 604, the network connectivity components 606, the sensor components 608, the input/output ("I/O") components 610, and the power components 612. Although no connections are shown between the individuals components illustrated in FIG. 6, the components can interact to carry out device functions. In some embodiments, the components are arranged so as to communicate via one or more busses (not shown).

The processor 602 includes a central processing unit ("CPU") configured to process data, execute computer-executable instructions of one or more application programs, and communicate with other components of the computing device architecture 600 in order to perform various functionality described herein. The processor 602 may be utilized to execute aspects of the software components presented herein and, particularly, those that utilize, at least in part, a touch-enabled input.

In some embodiments, the processor 602 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, and greater), video games, three-dimensional ("3D") modeling applications, and the like. In some embodiments, the processor 602 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 602 is, or is included in, a system-on-chip ("SoC") along with one or more of the other components described herein below. For example, the SoC may include the processor 602, a GPU, one or more of the network connectivity components 606, and one or more of the sensor components 608. In some embodiments, the processor 602 is fabricated, in part, utilizing a package-on-package ("PoP") integrated circuit packaging technique. Moreover, the processor 602 may be a single core or multi-core processor.

The processor 602 may be created in accordance with an ARM architecture, available for license from ARM HOLDINGS of Cambridge, United Kingdom. Alternatively, the processor 602 may be created in accordance with an x86 architecture, such as is available from INTEL CORPORATION of Mountain View, Calif. and others. In some embodiments, the processor 602 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 604 include a random access memory ("RAM") 614, a read-only memory ("ROM") 616, an integrated storage memory ("integrated storage") 618, and a removable storage memory ("removable storage") 620. In some embodiments, the RAM 614 or a portion thereof, the ROM 616 or a portion thereof, and/or some combination the RAM 614 and the ROM 616 is integrated in the processor 602. In some embodiments, the ROM 616 is configured to store a firmware, an operating system or a portion thereof (e.g., operating system kernel), and/or a bootloader to load an operating system kernel from the integrated storage 618 or the removable storage 620.

The integrated storage 618 can include a solid-state memory, a hard disk, or a combination of solid-state memory and a hard disk. The integrated storage 618 may be soldered or otherwise connected to a logic board upon which the processor 602 and other components described herein also may be connected. As such, the integrated storage 618 is integrated in the computing device. The integrated storage 618 is configured to store an operating system or portions thereof, application programs, data, and other software components described herein.

The removable storage 620 can include a solid-state memory, a hard disk, or a combination of solid-state memory and a hard disk. In some embodiments, the removable storage 620 is provided in lieu of the integrated storage 618. In other embodiments, the removable storage 620 is provided as additional optional storage. In some embodiments, the removable storage 620 is logically combined with the integrated storage 618 such that the total available storage is made available and shown to a user as a total combined capacity of the integrated storage 618 and the removable storage 620.

The removable storage 620 is configured to be inserted into a removable storage memory slot (not shown) or other mechanism by which the removable storage 620 is inserted and secured to facilitate a connection over which the removable storage 620 can communicate with other components of the computing device, such as the processor 602. The removable storage 620 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 604 can store an operating system. According to various embodiments, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 606 include a wireless wide area network component ("WWAN component") 622, a wireless local area network component ("WLAN component") 624, and a wireless personal area network component ("WPAN component") 626. The network connectivity components 606 facilitate communications to and from a network 628, which may be a WWAN, a WLAN, or a WPAN. Although a single network 628 is illustrated, the network connectivity components 606 may facilitate simultaneous communication with multiple networks. For example, the network connectivity components 606 may facilitate simultaneous communications with multiple networks via one or more of a WWAN, a WLAN, or a WPAN.

In some embodiments, the functionality of the network 628 is provided by one or more of the networks 104, 504. In some embodiments, the network 628 includes one or more of the networks 104, 504. In some other embodiments, the network 628 provides access to one or more of the networks 104, 504.

The network 628 may be a WWAN, such as a mobile telecommunications network utilizing one or more mobile telecommunications technologies to provide voice and/or data services to a computing device utilizing the computing device architecture 600 via the WWAN component 622. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 628 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 628 may be configured to provide voice and/or data communications with any combination of the above technologies. The network 628 may be configured to or adapted to provide voice and/or data communications in accordance with future generation technologies.

In some embodiments, the WWAN component 622 is configured to provide dual-multi-mode connectivity to the network 628. For example, the WWAN component 622 may be configured to provide connectivity to the network 628, wherein the network 628 provides service via GSM and UMTS technologies, or via some other combination of technologies. Alternatively, multiple WWAN components 622 may be utilized to perform such functionality, and/or provide additional functionality to support other non-compatible technologies (i.e., incapable of being supported by a single WWAN component). The WWAN component 622 may facilitate similar connectivity to multiple networks (e.g., a UMTS network and an LTE network).

The network 628 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 624 is configured to connect to the network 628 via the WI-FI access points. Such connections may be secured via various encryption technologies including, but not limited, WI-FI Protected Access ("WPA"), WPA2, Wired Equivalent Privacy ("WEP"), and the like.

The network 628 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 626 is configured to facilitate communications with other devices, such as peripherals, computers, or other computing devices via the WPAN.

The sensor components 608 include a magnetometer 630, an ambient light sensor 632, a proximity sensor 634, an accelerometer 636, a gyroscope 638, and a Global Positioning System sensor ("GPS sensor") 640. It is contemplated that other sensors, such as, but not limited to, temperature sensors or shock detection sensors, also may be incorporated in the computing device architecture 600.

The magnetometer 630 is configured to measure the strength and direction of a magnetic field. In some embodiments the magnetometer 630 provides measurements to a compass application program stored within one of the memory components 604 in order to provide a user with accurate directions in a frame of reference including the cardinal directions, north, south, east, and west. Similar measurements may be provided to a navigation application program that includes a compass component. Other uses of measurements obtained by the magnetometer 630 are contemplated.

The ambient light sensor 632 is configured to measure ambient light. In some embodiments, the ambient light sensor 632 provides measurements to an application program stored within one the memory components 604 in order to automatically adjust the brightness of a display (described below) to compensate for low-light and high-light environments. Other uses of measurements obtained by the ambient light sensor 632 are contemplated.

The proximity sensor 634 is configured to detect the presence of an object or thing in proximity to the computing device without direct contact. In some embodiments, the proximity sensor 634 detects the presence of a user's body (e.g., the user's face) and provides this information to an application program stored within one of the memory components 604 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 634 are contemplated.

The accelerometer 636 is configured to measure proper acceleration. In some embodiments, output from the accelerometer 636 is used by an application program as an input mechanism to control some functionality of the application program. For example, the application program may be a video game in which a character, a portion thereof, or an object is moved or otherwise manipulated in response to input received via the accelerometer 636. In some embodiments, output from the accelerometer 636 is provided to an application program for use in switching between landscape and portrait modes, calculating coordinate acceleration, or detecting a fall. Other uses of the accelerometer 636 are contemplated.

The gyroscope 638 is configured to measure and maintain orientation. In some embodiments, output from the gyroscope 638 is used by an application program as an input mechanism to control some functionality of the application program. For example, the gyroscope 638 can be used for accurate recognition of movement within a 3D environment of a video game application or some other application. In some embodiments, an application program utilizes output from the gyroscope 638 and the accelerometer 636 to enhance control of some functionality of the application program. Other uses of the gyroscope 638 are contemplated.

The GPS sensor 640 is configured to receive signals from GPS satellites for use in calculating a location. The location calculated by the GPS sensor 640 may be used by any application program that requires or benefits from location information. For example, the location calculated by the GPS sensor 640 may be used with a navigation application program to provide directions from the location to a destination or directions from the destination to the location. Moreover, the GPS sensor 640 may be used to provide location information to an external location-based service, such as E911 service. The GPS sensor 640 may obtain location information generated via WI-FI, WIMAX, and/or cellular triangulation techniques utilizing one or more of the network connectivity components 606 to aid the GPS sensor 640 in obtaining a location fix. The GPS sensor 640 may also be used in Assisted GPS ("A-GPS") systems.

The I/O components 610 include a display 642, a touchscreen 644, a data I/O interface component ("data I/O") 646, an audio I/O interface component ("audio I/O") 648, a video I/O interface component ("video I/O") 650, and a camera 652. In some embodiments, the display 642 and the touchscreen 644 are combined. In some embodiments two or more of the data I/O component 646, the audio I/O component 648, and the video I/O component 650 are combined. The I/O components 610 may include discrete processors configured to support the various interface described below, or may include processing functionality built-in to the processor 602.

The display 642 is an output device configured to present information in a visual form. In particular, the display 642 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 642 is a liquid crystal display ("LCD") utilizing any active or passive matrix technology and any backlighting technology (if used). In some embodiments, the display 642 is an organic light emitting diode ("OLED") display. Other display types are contemplated.

The touchscreen 644 is an input device configured to detect the presence and location of a touch. The touchscreen 644 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 644 is incorporated on top of the display 642 as a transparent layer to enable a user to use one or more touches to interact with objects or other information presented on the display 642. In other embodiments, the touchscreen 644 is a touch pad incorporated on a surface of the computing device that does not include the display 642. For example, the computing device may have a touchscreen incorporated on top of the display 642 and a touch pad on a surface opposite the display 642.

In some embodiments, the touchscreen 644 is a single-touch touchscreen. In other embodiments, the touchscreen 644 is a multi-touch touchscreen. In some embodiments, the touchscreen 644 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 644. As such, a developer may create gestures that are specific to a particular application program.

In some embodiments, the touchscreen 644 supports a tap gesture in which a user taps the touchscreen 644 once on an item presented on the display 642. The tap gesture may be used for various reasons including, but not limited to, opening or launching whatever the user taps. In some embodiments, the touchscreen 644 supports a double tap gesture in which a user taps the touchscreen 644 twice on an item presented on the display 642. The double tap gesture may be used for various reasons including, but not limited to, zooming in or zooming out in stages. In some embodiments, the touchscreen 644 supports a tap and hold gesture in which a user taps the touchscreen 644 and maintains contact for at least a predefined time. The tap and hold gesture may be used for various reasons including, but not limited to, opening a context-specific menu.

In some embodiments, the touchscreen 644 supports a pan gesture in which a user places a finger on the touchscreen 644 and maintains contact with the touchscreen 644 while moving the finger on the touchscreen 644. The pan gesture may be used for various reasons including, but not limited to, moving through screens, images, or menus at a controlled rate. Multiple finger pan gestures are also contemplated. In some embodiments, the touchscreen 644 supports a flick gesture in which a user swipes a finger in the direction the user wants the screen to move. The flick gesture may be used for various reasons including, but not limited to, scrolling horizontally or vertically through menus or pages. In some embodiments, the touchscreen 644 supports a pinch and stretch gesture in which a user makes a pinching motion with two fingers (e.g., thumb and forefinger) on the touchscreen 644 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 644. As such, the above gestures should be understood as being illustrative and should not be construed as being limiting in any way.

The data I/O interface component 646 is configured to facilitate input of data to the computing device and output of data from the computing device. In some embodiments, the data I/O interface component 646 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 648 is configured to provide audio input and/or output capabilities to the computing device. In some embodiments, the audio I/O interface component 646 includes a microphone configured to collect audio signals. In some embodiments, the audio I/O interface component 646 includes a headphone jack configured to provide connectivity for headphones or other external speakers. In some embodiments, the audio interface component 648 includes a speaker for the output of audio signals. In some embodiments, the audio I/O interface component 646 includes an optical audio cable out.

The video I/O interface component 650 is configured to provide video input and/or output capabilities to the computing device. In some embodiments, the video I/O interface component 650 includes a video connector configured to receive video as input from another device (e.g., a video media player such as a DVD or BLURAY player) or send video as output to another device (e.g., a monitor, a television, or some other external display). In some embodiments, the video I/O interface component 650 includes a High-Definition Multimedia Interface ("HDMI"), mini-HDMI, micro-HDMI, DisplayPort, or proprietary connector to input/output video content. In some embodiments, the video I/O interface component 650 or portions thereof is combined with the audio I/O interface component 648 or portions thereof.

The camera 652 can be configured to capture still images and/or video. The camera 652 may utilize a charge coupled device ("CCD") or a complementary metal oxide semiconductor ("CMOS") image sensor to capture images. In some embodiments, the camera 652 includes a flash to aid in taking pictures in low-light environments. Settings for the camera 652 may be implemented as hardware or software buttons.

Although not illustrated, one or more hardware buttons may also be included in the computing device architecture 600. The hardware buttons may be used for controlling some operational aspect of the computing device. The hardware buttons may be dedicated buttons or multi-use buttons. The hardware buttons may be mechanical or sensor-based.

The illustrated power components 612 include one or more batteries 654, which can be connected to a battery gauge 656. The batteries 654 may be rechargeable or disposable. Rechargeable battery types include, but are not limited to, lithium polymer, lithium ion, nickel cadmium, and nickel metal hydride. Each of the batteries 654 may be made of one or more cells.

The battery gauge 656 can be configured to measure battery parameters such as current, voltage, and temperature. In some embodiments, the battery gauge 656 is configured to measure the effect of a battery's discharge rate, temperature, age and other factors to predict remaining life within a certain percentage of error. In some embodiments, the battery gauge 656 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 612 may also include a power connector, which may be combined with one or more of the aforementioned I/O components 610. The power components 612 may interface with an external power system or charging equipment via a power I/O component 644.

Based on the foregoing, it should be appreciated that technologies for transforming data into consumable content have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for transforming data, the computer-implemented method comprising performing computer-implemented operations for:
   obtaining, at a computing device, data comprising a plurality of data elements;
   analyzing the data to identify relationships between the plurality of data elements;
   determining a world defining a visualization model to apply to the plurality of data elements based, at least partially, upon the relationships;
   obtaining rules for applying the data to the world; and
   applying the rules to the data to generate output comprising the at least one of the plurality of data elements arranged according to the world.

2. The method of claim 1, further comprising:
   presenting the output at a display device associated with the computing device; and
   obtaining feedback from a user of the computing device.

3. The method of claim 2, further comprising:
   determining, if the output is to be modified based, at least partially, upon the feedback; and
   in response to determining that the output is to be modified, modifying the output in accordance with the feedback.

4. The method of claim 3, wherein the feedback comprises an indication that an aspect of the output is liked by the user.

5. The method of claim 3, wherein the feedback comprises an indication that an aspect of the output is disliked by the user, and wherein the aspect comprises at least one of an emphasis, a grouping, or an order of data within the output.

6. The method of claim 1, wherein determining the world comprises:
   determining at least one variation to apply to the plurality of data elements for differentiating the output;
   determining the visualization model based upon the variation and the relationships; and
   selecting the world based, at least partially, upon the visualization model and the relationships.

7. The method of claim 1, wherein the computing device is configured to execute a transformation engine, and wherein the transformation engine comprises a decomposition and understanding module, a variation module, a world chooser module, a design rules module, and an authoring module.

8. The method of claim 1, wherein the data comprises a presentation document, and wherein the output comprises a further presentation document.

9. A computer storage medium having computer readable instructions stored thereupon that, when executed by a computer, cause the computer to:
   obtain data comprising a plurality of data elements;
   analyze the data to identify relationships between the plurality of data elements;
   determine a world defining a visualization model to apply to the plurality of data elements based, at least partially, upon the relationships;
   obtain a rule for applying the data to the world; and
   apply the rule to the data to generate output comprising the plurality of data elements arranged according to the world.

10. The computer storage medium of claim 9, further comprising computer readable instructions that, when executed by the computer, cause the computer to determine the world by:
    determining at least one variation to apply to at least one of the plurality of data elements to differentiate the output;
    determining the visualization model based upon the variation and the relationships; and
    selecting the world based, at least partially, upon the visualization model and the relationships.

11. The computer storage medium of claim 9, further comprising computer readable instructions that, when executed by the computer, cause the computer to:
    present the output at a display device associated with the computer; and
    obtain feedback from a user of the computer.

12. The computer storage medium of claim 11, wherein the feedback comprises an indication that an aspect of the output is liked.

13. The computer storage medium of claim 11, wherein the feedback comprises an indication that an aspect of the output is disliked.

14. The computer storage medium of claim 9, wherein the computer executes a transformation engine comprising:
   a decomposition and understanding module configured to determine the relationships;
   a variation module for determining variations to the data elements; and
   a world chooser module for determining the world.

15. The computer storage medium of claim 9, further comprising computer readable instructions that, when executed by the computer, cause the computer to:
   present the output at a display device associated with the computer;
   obtain feedback from a user of the computer;
   determine, if the output is to be modified based, at least partially, upon the feedback; and
   in response to determining that the output is to be modified, modify the input in accordance with the feedback.

16. The computer storage medium of claim 15, wherein the computer executes a transformation engine comprising:
   a decomposition and understanding module configured to determine discrete sub-content, relationships, and emphasis,
   a variation module for determining variations to the data elements,
   a world chooser module for determining the world, and
   an authoring module for obtaining the feedback and determining if the output is to be modified.

17. The computer storage medium of claim 16, wherein the data comprises a presentation document, and wherein the output comprises a further presentation document.

18. The computer storage medium of claim 9, wherein the relationships comprise a hierarchy between the plurality of data elements.

19. A computer storage medium having computer readable instructions stored thereupon that, when executed by a computer, cause the computer to:
   obtain data comprising a plurality of data elements;
   analyze the data to identify relationships between the plurality of data elements;
   determine a world defining a visualization model to apply to the plurality of data elements based, at least partially, upon the relationships;
   obtain rules for applying the data to the world;
   apply the rules to the data to generate output comprising the plurality of data elements arranged according to the rules;
   present the output at a display device;
   obtain feedback comprising at least one of
      an indication that an aspect of the output is liked, or
      indication that the aspect of the output is disliked;
   determine that the output is to be modified based, at least partially, upon the feedback; and
   in response to determining that the output is to be modified, modify the output in accordance with the feedback.

20. The computer storage medium of claim 19, wherein the computer executes a transformation engine comprising:
   a decomposition and understanding module configured to determine the relationships;
   a variation module for determining variations to the data elements;
   a world chooser module for determining the world; and
   an authoring module for obtaining the feedback and determining if the output is to be modified.

* * * * *